Figure 1:
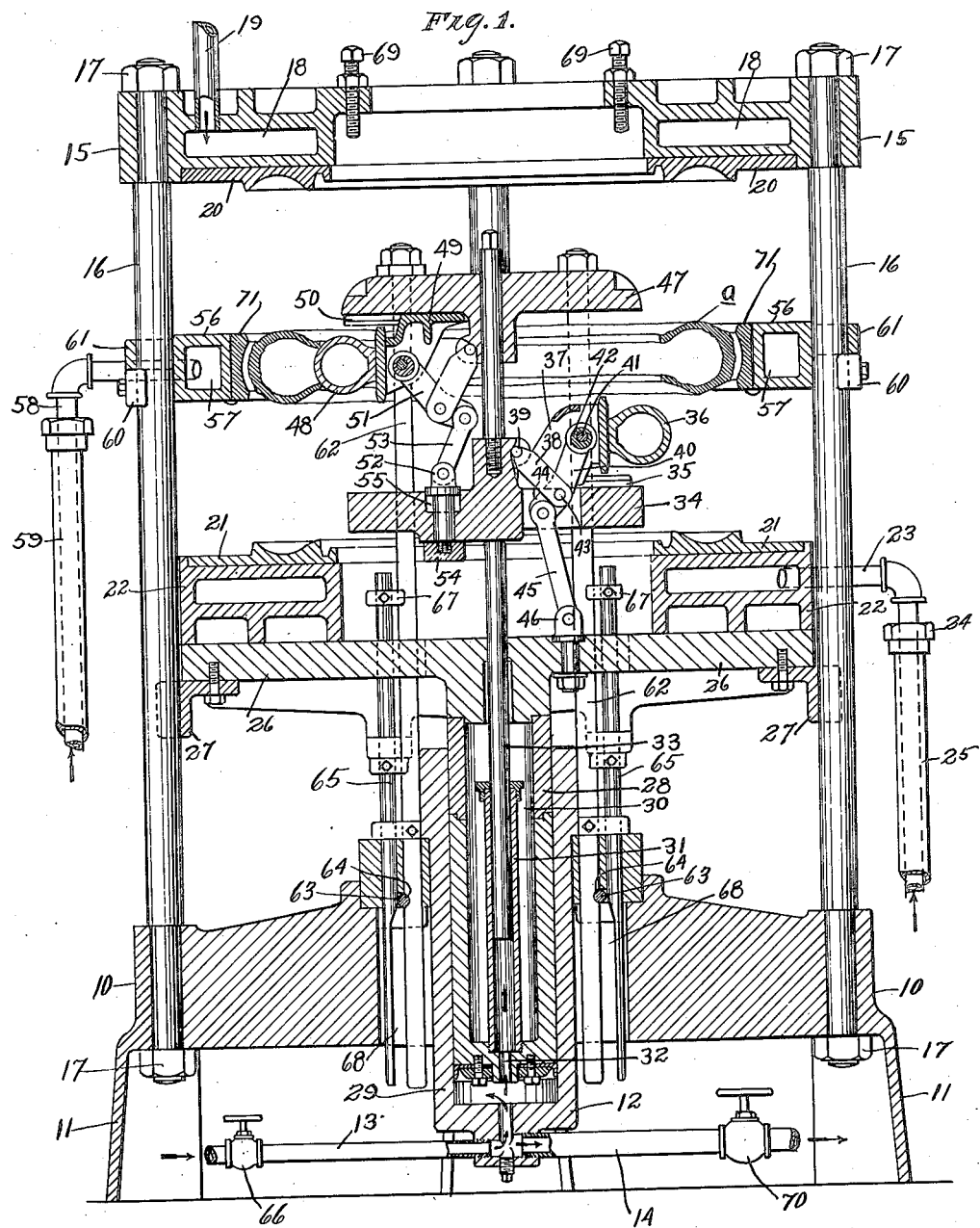

H. J. DOUGHTY.
MOLDING AND VULCANIZING MACHINE.
APPLICATION FILED DEC. 30, 1912.

Patented June 30, 1914.

Witnesses,
W. W. Bardsley
E. F. Ogden

Inventor,
Henry J. Doughty.

By Howard E. Barlow
Attorney.

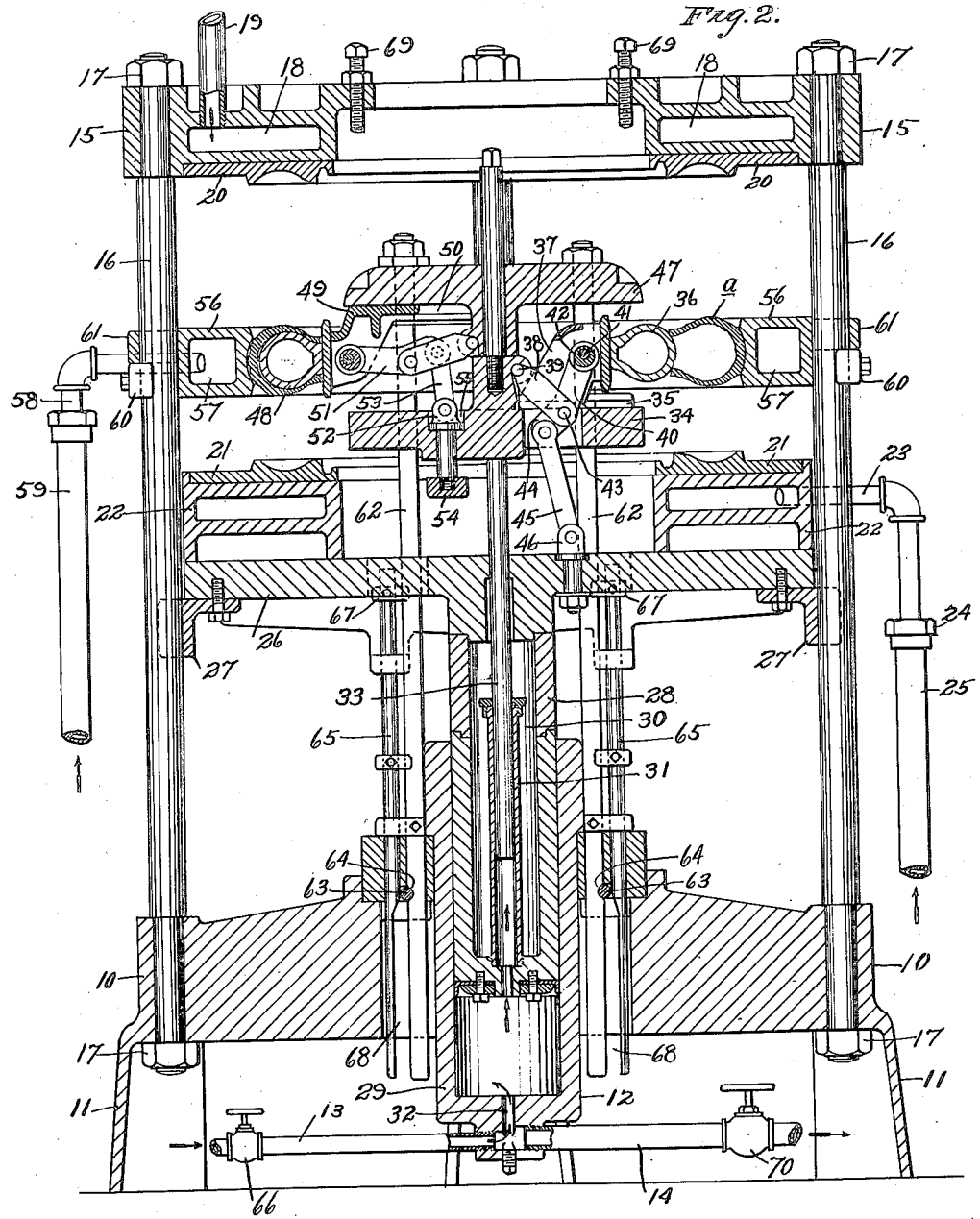

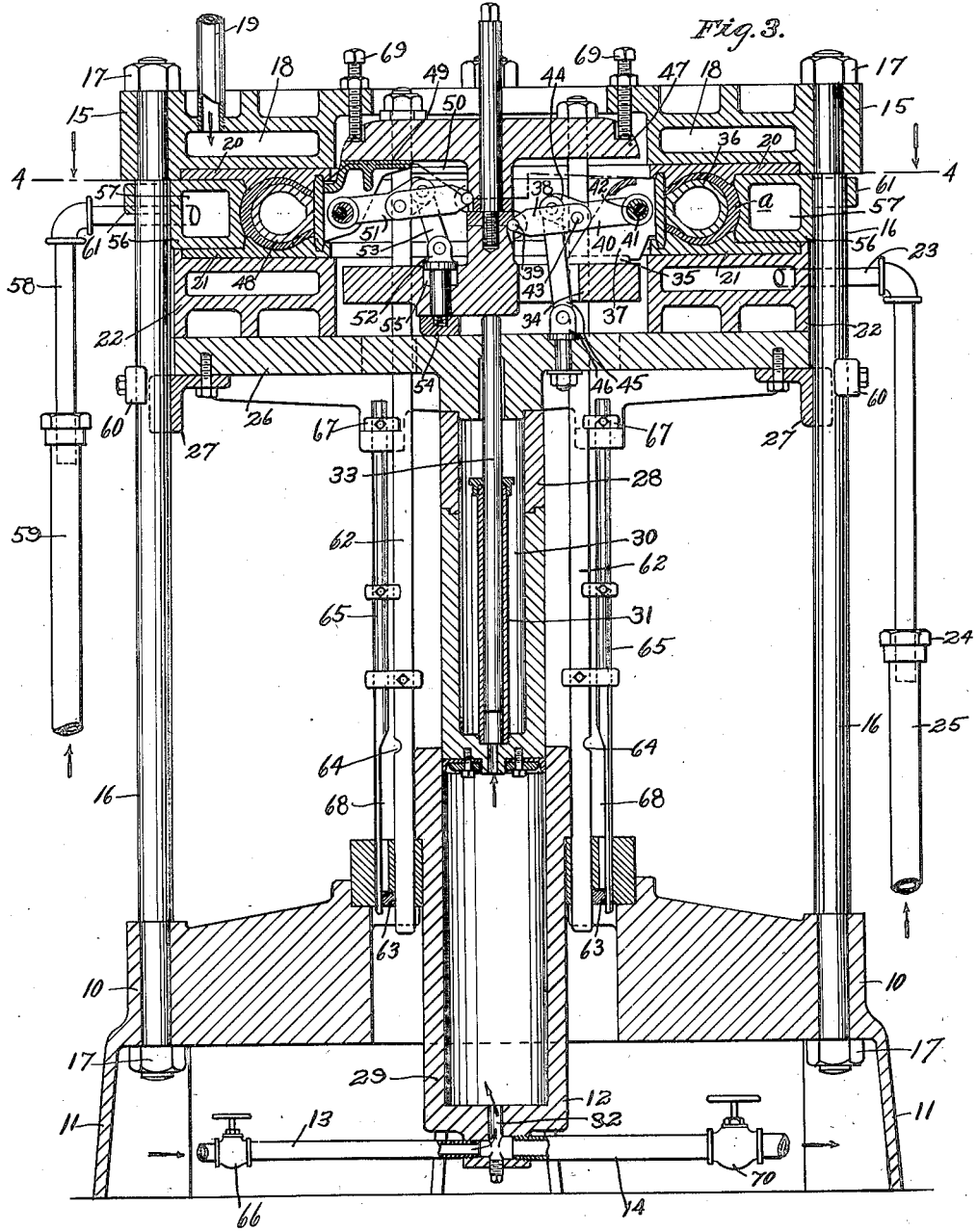

H. J. DOUGHTY.
MOLDING AND VULCANIZING MACHINE.
APPLICATION FILED DEC. 30, 1912.
1,101,732.
Patented June 30, 1914.
4 SHEETS—SHEET 4.
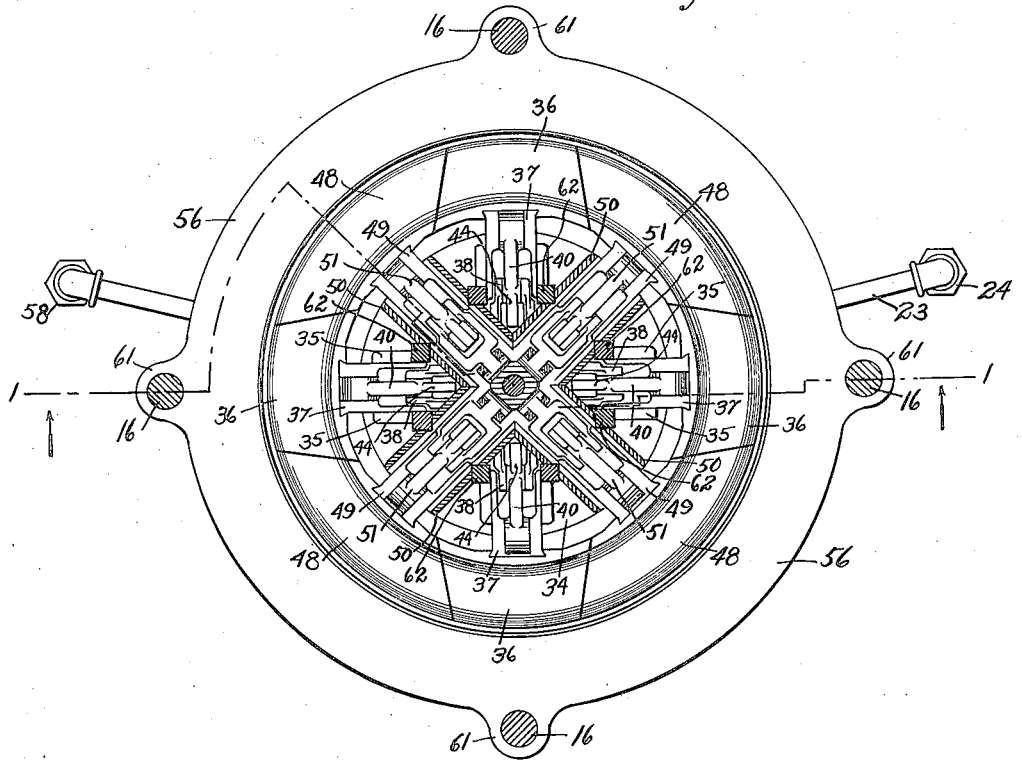
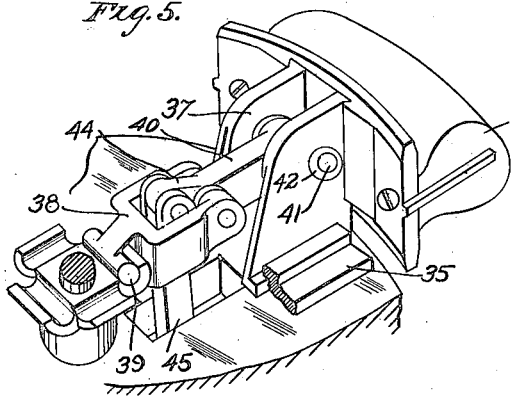
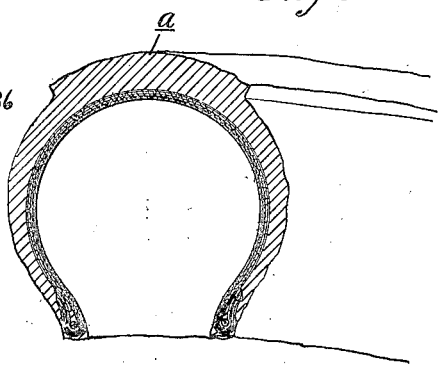
Witnesses,
Inventor,
Henry J. Doughty.
By
Howard E. Barlow
Attorney.

UNITED STATES PATENT OFFICE.

HENRY J. DOUGHTY, OF EDGEWOOD, RHODE ISLAND, ASSIGNOR TO DOUGHTY TIRE COMPANY, OF PORTLAND, MAINE, A CORPORATION OF MAINE.

MOLDING AND VULCANIZING MACHINE.

1,101,732.           Specification of Letters Patent.      Patented June 30, 1914.

Application filed December 30, 1912. Serial No. 739,233.

*To all whom it may concern:*

Be it known that I, HENRY J. DOUGHTY, a citizen of the United States, and resident of Edgewood, in the county of Providence and State of Rhode Island, have invented certain new and useful Improvements in Molding and Vulcanizing Machines, of which the following is a specification.

This invention relates to a molding and vulcanizing machine for tire casings, and the like, and has for its object to provide a separable mold for receiving a tire casing which has been roughly built up into the desired form, to then insert an expandible core into the casing and force it into a mold of the desired shape with a very heavy pressure whereby the casing is permanently formed and heat is applied to the mold to vulcanize the casing.

A further object of this invention is to divide the mold ring through different longitudinal planes into three parts, the middle part being an independent undivided vulcanizing section for firmly and unyieldingly supporting the tread portion of the casing against the line of maximum pressure whereby the rubber in this portion of the casing is more securely formed into the pores of the fabric and the whole bound together so firmly as to effectually prevent the rubber on the tread from separating from the fabric and to obtain the maximum wearing life of the tire.

A still further object of the invention is to provide a plurality of sets of core segments and to provide means whereby said sets may be moved to relatively different vertical planes to permit the required contraction of the segments to readily receive the roughly built up casing to be molded and to also permit the finished tire to be readily removed therefrom. The removing of some of these segments to a relatively different plane is found in practice to be absolutely necessary, owing to the very large diameter of the usual tire casing in cross section, as compared to its circumferential measurement which renders it impossible to collapse or draw the segments together sufficiently to receive the casing unless some of the segments are removed from the plane of the others to render such contraction possible.

A still further object of the invention is to provide a toggle joint for moving the segments radially, and to offset the free end of the operating link of said joints, whereby both the last opening and the first closing radial movements of the segments are rendered much easier.

With these and other objects in view, the invention consists of certain novel features of construction, as will be more fully described and particularly pointed out in the appended claims.

Of the accompanying drawings: Figure 1— is a sectional elevation on line 1—1 of Fig. 4, illustrating the molding ring in its extremely open position with one set of the core segments collapsed, and the second set of segments withdrawn to a lower plane and a rough tire casing shown in position ready to be acted upon. Fig. 2— is the same as Fig. 1 with the exception that the first set of core segments have been carried out into the tire casing and the second set elevated to the same plane as the first set ready to be carried outward into the casing. Fig. 3— is the same view of the machine as illustrated in Fig. 2, but with the parts all in operative position showing both sets of segments as having been expanded into the tire casing, and the three sections in position to receive the heat and be vulcanized therein. Fig. 4— is a plan sectioned on line 4—4 of Fig. 3, showing the mechanism in expanded position. Fig. 5— is a perspective view illustrating the mechanism for operating one of the smaller sections. Fig. 6— is a perspective view in section showing the finished tire casing.

Referring to the drawings, 10 designates the base portion of the machine supported on legs 11—11. In this base is mounted a cylinder 12 supplied with water or other fluid under high pressure through the pipe 13, which fluid is discharged after operating, through the pipe 14. A head portion 15 is supported some distance above the base by tie rods 16 firmly secured in position by the nuts 17 at either end. This head is cored out at 18 to provide an annular steam chamber which is supplied with steam through the pipe 19. On the lower face of this chamber is secured the upper section 20 of the three part mold ring. The lower part 21 of the mold ring is supported on the annular steam chamber 22 which chamber is supplied with steam through the pipe 23, said pipe being adapted to telescope through the stuffing box 24 into the larger pipe 25 as this chamber is raised and lowered in the manner presently described. This lower steam chamber is supported on the follower plate 26 which is provided with supporting guides 27 for slidably engaging the tie rods 16. This follower plate is supported by a large sectional piston 28 which extends down into the cylinder 12, the lower end of said piston being provided with the usual packing 29. This piston is formed hollow at 30 and within the hollow chamber is mounted a second and smaller cylinder 31 which has a communicating port 32 through the bottom of the larger piston 28. An elongated small piston 33 extends into this cylinder 31 and is for the purpose of supporting the small segment guide plate 34. This segment plate is provided with guide ways 35 in which the four smaller core segments 36 are mounted to slide radially on the carriages 37 toward and from the center. In order to obtain this movement I have provided a toggle joint as constructed of a link 38 pivoted to the plate 34, at 39, and another link 40 pivoted to the carriage on the pin 41, this end of this link being provided with an eccentric sleeve 42 by the rotation of which the extent of throw of the toggle may be adjusted. This link 40 is pivoted to the link 38 at 43 and its lower or free end 44 is tipped slightly upward out of line with the axis thereof and to this end is pivoted the connector 45 which is in turn pivoted to the eye bolt 46 secured to the follower plate 26. Above this small segment guide plate is mounted the large segment guide plate 47 on which each of the large segments 48 are mounted to slide toward and from the center on their respective carriages 49 in their guide ways 50. These segments are moved toward and from the center by a toggle joint arranged similar to that above described as connected to the small segments 36, the free end of the longer link 51, however, being pivotally connected to the eye bolt 52 in the independently movable plate 34 by means of the connector 53. This eye bolt 52 passes entirely through the plate 34 and is loosely mounted to slide endwise through said plate, its upper end sliding into the socket 55 and its lower end being engaged by a nut 54.

56 designates the middle portion of the tire mold. The same is made in the form of a ring having a hollow center portion 57 supplied with vulcanizing heat by steam through the pipe 58 which pipe is adapted to telescope into the larger pipe 59 as this ring moves up and down. Limit lugs 60 are secured to the outside of the tie rods 16 and are engaged by ears 61 on this middle core to arrest its downward movement when the core portions are being separated for the purpose of removing the tire casing.

In order to support the larger core segments 48 in line with the center of the middle mold section I have supported the plate 47, that carries them, on long guide rods 62, which extend down through the base portion of the machine and are arranged to be locked by the lock roll 63 which enters notch 64 in said rods, which roll is actuated by means of the lock rod 65 in the manner hereinafter described.

The operation of my improved molding and vulcanizing machine may be more fully described as follows: With the parts in open or inoperative position, as illustrated in Fig. 1, the fluid under pressure is first turned on by opening the valve 66. The water then enters the cylinder 12 and passes up through the aperture 32 into the small cylinder 31 where it acts upon the small elongated piston 33 simultaneously with the big piston 28, carrying upward both the small segment plate 34 and the follower plate 26 through the joint action of their respective pistons into the position illustrated in Fig. 2. This upward movement, as will be seen, has through the action of their toggle joints, carried the larger segments 48 out into the tire casing, but not to the fullest extent of its stroke, as the pin 52 has moved downward into its socket and thereby prevented this extreme movement. The small segments 36 have now been brought up into line with the tire casing. As these members now continue to travel upward it will be seen that the plate 26 engages the dogs 67 on the lock rods 65, raising them so that the cut away portion 68 permits the lock rolls 63 to disengage the notches 64, thus releasing the guide rods 62 and permitting the top plate 47 to rise with the whole, up to the position illustrated in Fig. 3 against the adjustable stop screws 69. The continued upward movement of the follower plate 26 acting through the connector 45 and its attached toggle joint, forces outward the small core segments 36 into the position illustrated in Fig. 3, and the final upward movement of this follower plate 26 then engages the nuts 54 of the eye bolts 52 and through the connector 45 and this eye bolt 52, forces all of the segments simultaneously with tremendous pressure out into the mold and holds the same there rigid until the heat in the respective steam chambers has vulcanized the whole tire into permanent shape. After the tire has been subjected to sufficient pressure and heat the pressure valve 66 is closed and the valve 70 in the discharge pipe 14 is opened allowing the fluid to run out of the cylinders and permitting the different portions of the mold to separate and the core sections to be withdrawn by such downward separating motion from their normal into the position illustrated in Fig. 1, whereby the finished tire casing $a$ may be readily removed and another positioned to be operated upon in the manner described.

One of the essential features of my improved construction is that the mold is divided into three separate parts. That the middle section is broad enough to embrace practically the whole tread portion of the casing so that the tread portion may be acted upon with the greatest pressure being in a direct line with the greatest force, the mold at this point having a continuous surface and is not parted at this point like other molds, and that the same is supplied with an independent heating chamber. In other words, when a mold is parted at this point of greatest pressure it cannot withstand the tremendous force without separating and permitting a portion of the rubber to ooze out through the parting, therefore with my improved construction I am enabled to apply a far greater pressure to the tread portion than would be possible with a mold of any other shape, thereby causing the rubber to permeate the fabric structure and bind the whole into a homogenous mass positively preventing the tread portion from being torn or removed from the fabric and giving to the tire its maximum life and wearing qualities.

In some cases it is found desirable to construct the inner contacting mold face of the middle vulcanizing section with an inner annular facing ring 71, as illustrated in Fig. 1, so that a larger or smaller tire casing may be accommodated in this machine by simply replacing this facing ring 71 with another of the required diameter.

I claim:

1. In a machine of the character described, a separable mold ring, a plurality of sets of core segments, and means for moving said sets inwardly and then moving one of said sets at an angle to the plane of movement specified.

2. In a machine of the character described, a separable mold ring, a plurality of sets of core segments, means for moving said sets radially and then at an angle to the plane of movement specified when the mold ring is opened, and means for restoring the parts to normal.

3. In a molding and vulcanizing machine for tire casings, a mold ring, a plurality of core segments, means for moving all of said segments inward and some of said segments at an angle to the plane of movement specified.

4. In a molding and vulcanizing machine for tire casings, a mold ring, a plurality of horizontally movable core segments, means for moving inward said segments, and means whereby some of said segments may be dropped below the plane of the others to permit the required contraction of the latter.

5. In a molding and vulcanizing machine for tire casings, a mold ring, a plurality of core segments, means for moving inward said segments, and means whereby every other one of said segments may be moved at an angle to the plane of movement specified to permit the required contraction of the latter.

6. In a machine of the class described, a separable mold ring, a plurality of sets of core segments, means for moving said segments inward, and means for imparting relatively angular movements to said sets as the sections of the mold ring are separated.

7. In a molding and vulcanizing machine for tire casings, a separable mold, two sets of core segments, means for moving said segments radially and then for moving one of said sets at an angle to the plane of movement specified, when the mold is separated.

8. In a molding and vulcanizing machine for tire casings, a separable mold, two sets of core segments, means for moving said segments radially and then for moving one of said sets at an angle to the plane of movement specified, simultaneously with the separating movement of said mold.

9. In a molding and vulcanizing machine for tire casings, a separable mold, two sets of core segments, toggle joints for moving said segments radially and means for moving one of said sets of segments at an angle to the plane of movement specified as the mold is separated.

10. In a molding and vulcanizing machine for tire casings, a separable mold, two sets of core segments, each mounted on separate members, means for moving said segments radially on said members, and means for imparting relatively angular movements to said members whereby their segment sets are separated to permit of the desired contraction.

11. In a machine of the class described, a mold ring, two sets of core segments each slidably mounted on separate and independently movable members, means for moving the cores of each set radially on its member, means for moving said members to different planes relative to each other, the moving means of one set being actuated by the relative movement of the member carrying the other set, and an independently movable member for controlling the radial movement of the last mentioned set.

12. In a molding and vulcanizing machine for tire casings, a mold ring divided through different longitudinal planes into three parts, a plurality of core segments, and means whereby some of said segments may be withdrawn from the mold ring both radially and then at an angle to the plane of movement specified to permit the casing to be readily removed from the segments.

13. In a molding and vulcanizing machine for tire casings, a mold ring divided through different longitudinal planes into three parts and having a middle independent vulcanizing section, a plurality of core segments, and means whereby some of said segments may be moved radially inward and then at an angle to the plane of movement specified to permit the casing to be readily removed from said segments.

14. In a molding and vulcanizing machine for tire casings, a mold ring divided through different longitudinal planes into three parts and having a middle independent vulcanizing section, means for separating said sections, a plurality of core segments mounted to move radially in line with said middle section, and means for moving some of said segments transversely from the path of the other segments to relatively different planes.

15. In a machine of the class described, a mold ring divided through different longitudinal planes into three parts, a plurality of sets of core segments, and means for moving said sets radially and then at an angle to the plane of movement specified as the sections of the mold ring are moved from their extended position.

16. In a machine of the class described, a mold ring formed in three separate parts, means for separating said parts, two sets of core segments, means for moving said segments radially, means for then moving one of said sets at an angle to the plane of movement specified as the parts of said mold ring are separated, and means for restoring the parts to normal.

17. In a machine of the character described, a separable mold ring, means whereby the separate sections of said ring may be separated, a plurality of sets of core segments, means for moving said sets radially and for then moving one at least of said sets at an angle to the plane of movement specified, and fluid pressure means for restoring the parts to normal.

18. In a machine of the class described, a mold ring formed in three separate parts, means for separating said parts, two sets of core segments, means for moving said segments radially, means for moving one of said sets at an angle to the plane of movement specified as the parts of said mold ring are separated, and fluid pressure means for restoring the parts to normal.

19. In a machine of the class described, a mold ring, two sets of core segments each slidably mounted on separate relatively movable members, means for moving the core segments of each set radially on their members, means for moving said members at an angle to the plane of movement specified for said core segments, the moving means of one set of core segments being actuated by the relative movement of the member carrying the other set, an independently movable member for controlling the radial movement of the last mentioned set and fluid pressure means for exerting a molding pressure on the parts.

20. In a molding and vulcanizing machine for tire casings, a mold ring divided through different longitudinal planes into three parts and having a middle independent vulcanizing section, said middle section being provided with an independent removable inner facing ring, two sets of core segments, means for moving said segments radially, means for then moving one of said sets at an angle to the plane of movement specified as the parts of each mold ring are separated, and means for restoring the parts to normal.

In testimony whereof I affix my signature in presence of two witnesses.

HENRY J. DOUGHTY.

Witnesses:
HOWARD E. BARLOW,
E. I. OGDEN.